(12) United States Patent
Ohlerich et al.

(10) Patent No.: US 11,549,483 B2
(45) Date of Patent: Jan. 10, 2023

(54) ROTOR BLADE FOR A WIND TURBINE AND ROTOR BLADE TIP

(71) Applicant: Nordex Energy SE & Co. KG, Hamburg (DE)

(72) Inventors: Nick Ohlerich, Rostock (DE); Mehdi Doosttalab, Norderstedt (DE); Christof Rautmann, Hamburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 17/183,015

(22) Filed: Feb. 23, 2021

(65) Prior Publication Data

US 2021/0270233 A1 Sep. 2, 2021

(30) Foreign Application Priority Data

Mar. 2, 2020 (EP) .................................... 20160359

(51) Int. Cl.
*F03D 1/06* (2006.01)
*F03D 80/30* (2016.01)

(52) U.S. Cl.
CPC ........... *F03D 1/0675* (2013.01); *F03D 80/30* (2016.05); *F05B 2240/302* (2013.01); *F05B 2240/307* (2020.08); *F05B 2260/602* (2013.01)

(58) Field of Classification Search
CPC .... F03D 1/0633; F03D 1/0641; F03D 1/0675; F03D 1/0683; F03D 80/30; F05B 2240/302; F05B 2240/307; F05B 2260/602
See application file for complete search history.

(56) References Cited

U.S. PATENT DOCUMENTS

| | | | | |
|---|---|---|---|---|
| 8,647,068 B2 * | 2/2014 | Luebbe | ................... | F03D 80/30 416/223 R |
| 2011/0103963 A1 * | 5/2011 | Bendel | ................... | F03D 13/10 416/229 R |
| 2012/0003094 A1 * | 1/2012 | Hansen | ................... | F03D 80/30 29/889.71 |
| 2015/0064003 A1 * | 3/2015 | Drobietz | ................. | F03D 7/022 416/1 |
| 2016/0222945 A1 * | 8/2016 | Shiraishi | ................ | F03D 1/0675 |
| 2017/0335830 A1 * | 11/2017 | Ohlerich | ................. | F03D 80/30 |

FOREIGN PATENT DOCUMENTS

| | | | |
|---|---|---|---|
| DE | 10 2008 048 617 A1 | 4/2010 | |
| DE | 10 2014 112 316 A1 | 3/2015 | |
| DE | 10 2017 107 859 A1 | 10/2018 | |
| EP | 3712422 A1 * | 9/2020 | ........... F03D 1/0675 |
| WO | 2014023404 A1 | 2/2014 | |

* cited by examiner

*Primary Examiner* — Courtney D Heinle
*Assistant Examiner* — Sang K Kim
(74) *Attorney, Agent, or Firm* — Walter Ottesen, P.A.

(57) ABSTRACT

The invention is directed to a rotor blade for a wind turbine. The rotor blade has a rotor blade main body which delimits a rotor blade cavity. A rotor blade tip is connected fixedly to the rotor blade main body. The rotor blade tip has a drainage bore which is coupled fluidically to the rotor blade cavity and which is open toward a suction side surface of the rotor blade tip, so that, via the drainage bore, fluid from the rotor blade cavity drains to the outside at the suction side surface of the rotor blade tip. The invention is also directed to a rotor blade tip.

16 Claims, 3 Drawing Sheets

ROTOR BLADE FOR A WIND TURBINE AND ROTOR BLADE TIP

CROSS REFERENCE TO RELATED APPLICATION

This application claims priority of European patent application no. 20160359.4, filed Mar. 2, 2020, the entire content of which is incorporated herein by reference.

FIELD OF THE INVENTION

The disclosure relates to a rotor blade for a wind turbine, having a rotor blade main body and a rotor blade tip. The disclosure also relates to such a rotor blade tip.

BACKGROUND OF THE INVENTION

Current trends in the wind energy industry are leading to longer and longer rotor blades, for example rotor blades with a length of over 80 m. The rotor blades are produced from fiber composite materials and are hollow on the inside. Correspondingly large quantities of air are situated within these cavities. The water bound in the air can condense on the inner side of the rotor blades under corresponding conditions, for example changes in temperature, et cetera, which leads to water accumulations in the rotor blade. This water has to be able to flow out of the rotor blade to avoid consequential damage. One problem exists for example with lightning strikes, in which the briefly high current can lead to abrupt evaporation of the condensed water in the interior of the rotor blade. The vapor pressure built up by the evaporation can cause mechanical damage in the interior of the rotor blade.

The rotation of the rotor blade during the operation of the wind turbine results in the water accumulating typically in the region of the blade tip owing to centrifugal force. One possible solution for removing the water in the region of the blade tip is a drainage bore, which is formed typically at an angle to the pitch axis. The bore extends through the laminate and/or through a metallic blade tip receptor up to the end edge of the rotor blade. The rotor blade has only a small profile thickness in the region of the blade tip. Consequently, the diameter of the drainage bore is limited, with the disadvantage that, in the blade region in front of the bore, there may accumulate dirt, for example manufacturing residues and adhesive residue, which blocks the relatively small bore, with the result that water cannot flow away reliably. Moreover, depending on temperature and air pressure, a negative pressure can be formed in the blade, the negative pressure making it difficult for the entry hatches on the blade root to be opened or even damaging these.

SUMMARY OF THE INVENTION

An object on which the invention is based is to specify a concept for a rotor blade that contributes to a particularly effective discharge of water from a rotor blade.

A rotor blade for a wind turbine is disclosed. The rotor blade has a rotor blade main body which delimits a rotor blade cavity. The rotor blade main body is formed for example by two half-shells composed of fiber composite material which are connected fixedly to one another along the leading edge and the trailing edge. The rotor blade has a rotor blade tip which is connected fixedly to the rotor blade main body. Here, the rotor blade main body and the rotor blade tip may be produced as one part, for example from a fiber composite material. Alternatively, the rotor blade main body may be produced from a fiber composite material and the rotor blade tip may be produced from a current-conducting, for example metallic, material, and the rotor blade main body is connected fixedly to the rotor blade tip by means of an adhesive connection. The rotor blade tip has a drainage bore which is coupled fluidically to the rotor blade cavity. The drainage bore is open toward a suction side surface of the rotor blade tip, so that, by means of the drainage bore, removal of fluid, in particular water, from the rotor blade cavity to the outside is possible at the suction side surface of the rotor blade tip. Within the context of the invention, a drainage bore is to be understood as meaning both a straight-extending bore and a channel produced by another manufacturing process that may run in a rectilinear or else slightly curved manner.

For the described rotor blade, it is provided that the drainage bore connects the rotor blade cavity fluidically to the suction side surface of the rotor blade shell, so that discharge of condensed water from the rotor blade cavity to the outside directly via the blade tip is possible. An inlet opening of the drainage bore faces toward the rotor blade cavity, while an outlet opening of the drainage bore is arranged at the suction side (suction side surface) of the rotor blade tip. In other words, the drainage bore is open at one side toward the rotor blade cavity and at the other side toward the suction side. The drainage bore is for example a simple single rectilinear bore.

As a result of the drainage bore described, particularly effective and efficient discharge of water from the rotor blade is made possible. In particular, by means of the positioning, and the outlet, at the suction side of the drainage bore, it is made possible that, during the operation of the rotor blade, air is actively sucked out of the blade interior in the region of a negative pressure. This contributes considerably to improved water drainage of the rotor blade. Furthermore, there is no or only an insignificant negative influence on the aerodynamic profile of the blade tip. Furthermore, a contribution is made toward avoiding cost disadvantages due to consequential damage from the introduction of water in the blade interior. Furthermore, it is made possible for the bore to be configured with a larger diameter, since it extends through a region of the cross section of the profile in which this has sufficient thickness. Blockage of the bore can thus be reduced or even prevented. This allows cost savings through the avoidance of service tasks (drilling-out) to be achieved. Owing to the embodiment as a simple, straight-running bore, no further bores are necessary, and so the water can be conducted out rectilinearly. This contributes to simplified and/or reduced service tasks since simple drilling-out of the drainage bore is made possible. Angled running of the drainage bore or of a drainage channel up to the outlet from the blade tip, which would increase tendency toward blockage of the bore or the channel or increase the need for servicing, is thus avoided.

Preferably, the rotor blade tip is a separate component of the rotor blade. The rotor blade tip is for example configured to conduct current. For example, the rotor blade tip is manufactured from aluminum, wherein multi-component structures composed of metal, fiber material and non-current-conducting materials are also conceivable. The rotor blade tip is optionally configured as a lightning protection device, for example as a so-called receptor. The rotor blade tip is typically connected to the suction and pressure sides of the rotor blade, in particular adhesively bonded or laminated in between the two blade shells, during the manufacturing process of the rotor blade.

According to one embodiment, the drainage bore is formed in such a way that it is accessible only from the suction side. This has the advantage that the profile trailing edge of the rotor blade tip (rear edge), in contrast to solutions known from the prior art, has a closed, continuous contour. This makes possible a particularly effective aerodynamic profile on the rotor blade tip and makes a considerable positive contribution to the aerodynamic properties of the rotor blade tip and thus of the rotor blade, with the acoustic properties, in particular, being optimized. In particular, the trailing edge of the blade tip may have a particular slender configuration. It is also possible for the wind turbine, having such a rotor blade, to be operated in a mode associated with particularly high power.

According to one embodiment, the drainage bore, in a straight extension of its bore central axis, is freely accessible from the outside. This contributes, analogously to above, to making maintenance tasks at the bore possible in a simple manner. In particular, a bore clogged with dirt can easily be drilled out again. The bore is consequently directly accessible from the outside for maintenance tasks.

According to one embodiment, the suction side surface of the rotor blade tip has a depression in the region of an outlet opening of the drainage bore. This in turn contributes to improved accessibility of the bore from the outside. The depression furthermore contributes to ensuring particularly good aerodynamic and aeroacoustic properties of the rotor blade tip. The depression is for example a channel, or trough, formed in the blade tip that extends in the extension of the bore. Expressed in general terms, the drainage bore runs in a region of the blade having sufficient profile thickness and opens into the depression on the suction side. In this region of the depression, there is still a "residual profile thickness", and so the pressure side remains closed.

According to one embodiment, the depression is formed in such a way that the drainage bore, in a straight extension of its bore central axis of the drainage bore, is freely accessible from the outside, that is, at the outlet of the bore to the outside, the bore opens into a level, planar surface. In this way, production and maintenance are simplified, since better placement of for example a drill can be realized.

According to one embodiment, the depression is formed in such a way that the suction side surface, in a direction perpendicular to the bore central axis, has a substantially continuous contour. In other words, the depression, along the bore central axis, is formed to be free of edges and/or free of steps, for example rounded. In other words, the depression has no edges transverse to an air flow of the rotor blade during operation. This contributes particularly to an optimal flow profile, with the aerodynamic and aeroacoustic properties being optimized.

According to one embodiment, a bore central axis of the drainage bore extends at a particular angle in relation to a pitch axis of the rotor blade in the direction of a tip-side end of the rotor blade tip. The pitch axis of the rotor blade is the axis about which the rotor blade can be rotated. In this way, an incident flow angle for the rotor blade is set during operation. In particular, the bore central axis and thus the drainage bore do not extend parallel to the pitch axis. The drainage bore extends in the direction of the profile trailing edge, that is, the bore central axis points in the direction of the profile trailing edge. As a result of the orientation of the bore central axis, flow over the drainage bore perpendicular thereto and thus aeroacoustic resonance are prevented. This, too, contributes to a cost advantage.

The predetermined angle lies for example in an interval of 1° to 45°, preferably 1° to 15°. This constitutes an optimum for the aforementioned advantages and functions.

According to one embodiment, a diameter of the drainage bore is 1 mm to 20 mm in size, in particular is 8 mm, 9 mm or 10 mm.

According to one embodiment, a bore central axis of the drainage bore is inclined in relation to the pitch axis in such a way that the bore central axis, from the direction of a pressure side surface, extends in the direction of the suction side surface of the rotor blade tip. In other words, the bore central axis extends in a manner inclined in relation to a main extent plane or central plane of the rotor blade tip. This, too, contributes to allowing water to be particularly effectively discharged.

According to one embodiment, the rotor blade tip is provided with an aperture. The aperture is mounted in the region of the depression (cutout) and is permeable to water. The aperture has on its outer side a contour which is matched to the rotor blade surface, whereby the air flow on the outer contour can be optimized still further.

According to a further aspect, a rotor blade tip for a rotor blade of a wind turbine is disclosed. The rotor blade tip is configured to be connected fixedly to a rotor blade main body of the rotor blade. The rotor blade tip has a drainage bore which is able to be coupled fluidically to the rotor blade cavity and which is open toward a suction side surface of the rotor blade tip, so that, by means of the drainage bore, removal of fluid from the rotor blade cavity to the outside is possible at the suction side surface of the rotor blade tip.

The rotor blade tip makes possible the aforementioned advantages and functions. The above-described refinements apply analogously to the rotor blade tip.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
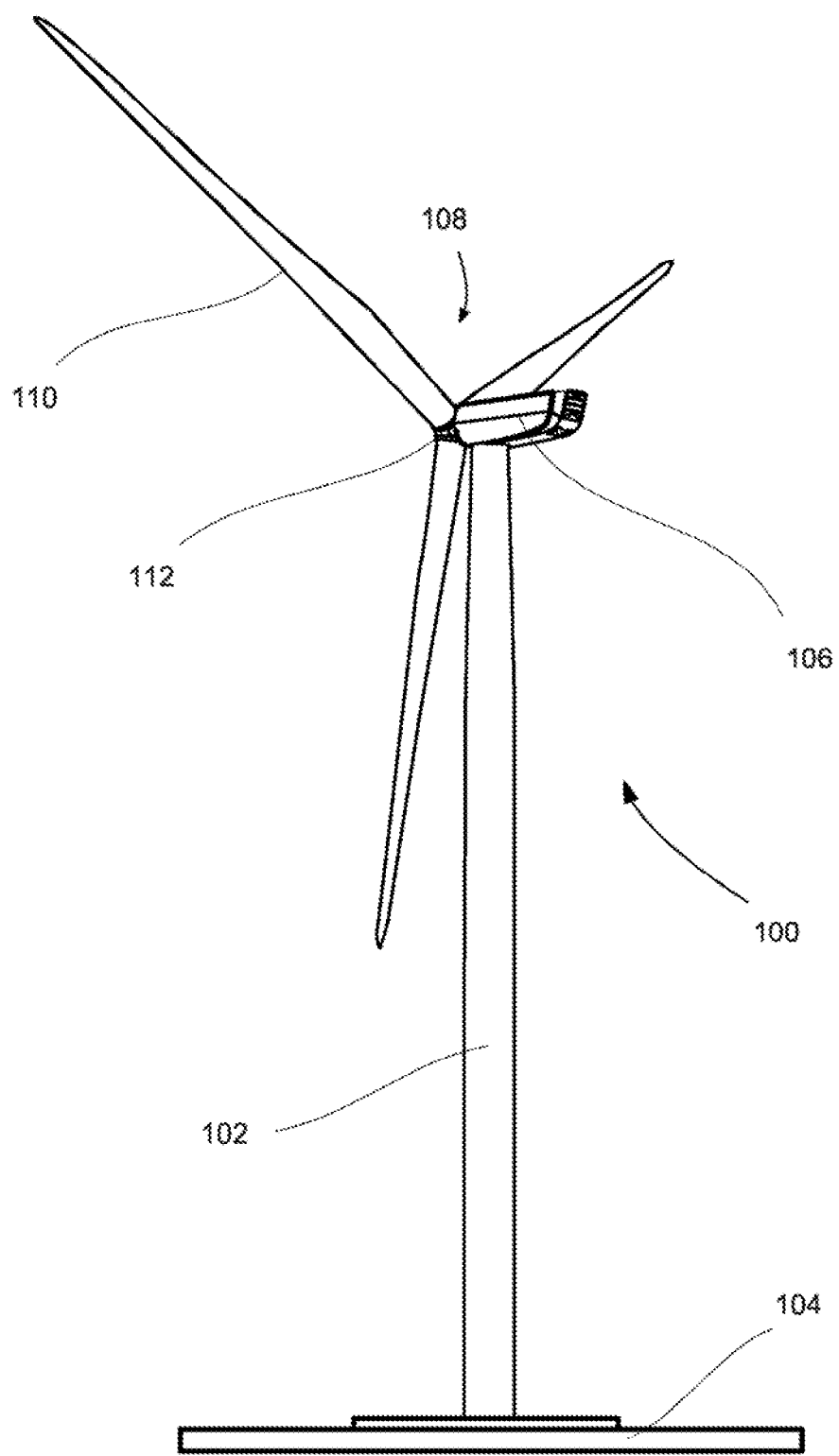
FIG. 1 is a schematic of a wind turbine.

FIG. 1 is a schematic of a wind turbine 100. The wind turbine 100 has a tower 102 fixed on a base by a foundation 104. A nacelle 106 is mounted rotatably on an end of the tower 102 that is opposite the base. The nacelle 106 has for example a generator which is coupled to a rotor 108 via a rotor shaft (not shown). The rotor 108 has one or more (wind turbine) rotor blades 110, which are arranged on a rotor hub 112.

During operation, the rotor 108 is set in rotation by a flow of air, for example wind. This rotational movement is transmitted via the rotor shaft and possibly a gear mechanism to the generator. The generator converts the kinetic energy of the rotor 108 into electrical energy.

Figure 2:
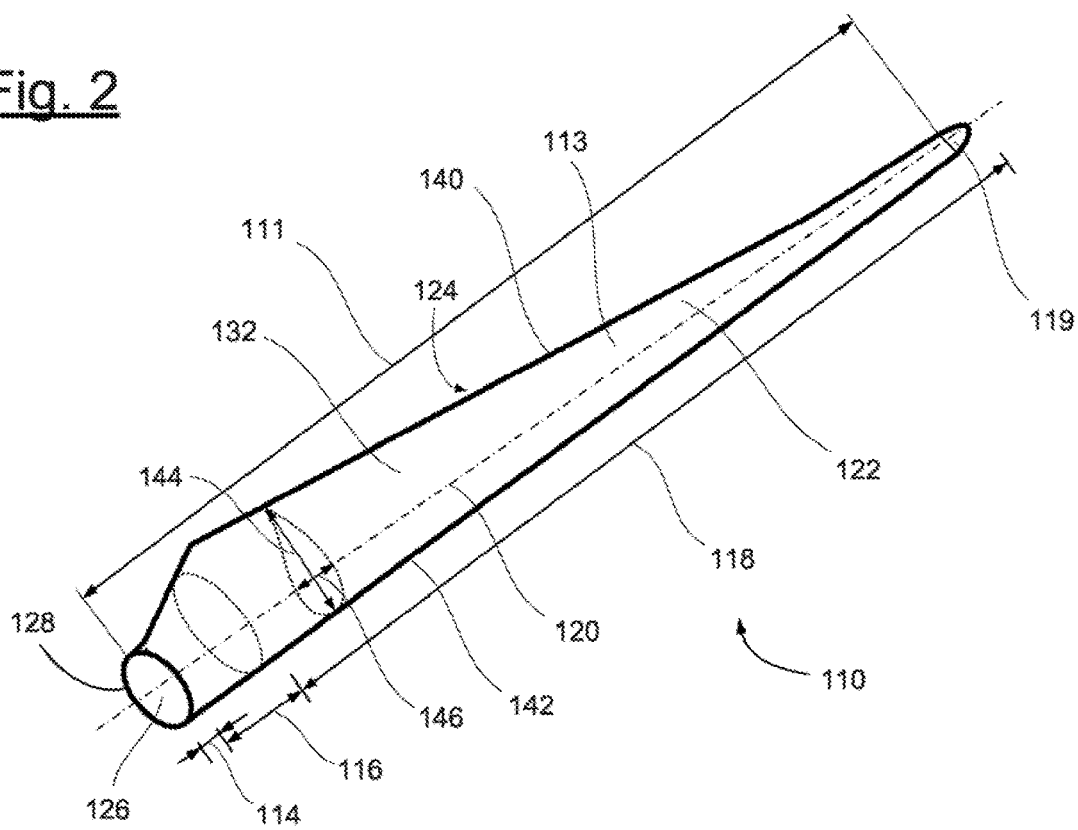
FIG. 2 is a schematic perspective view of a rotor blade.

FIG. 2 schematically shows a rotor blade 110. The rotor blade 110 has the shape of a conventional rotor blade, and is formed by a rotor blade main body 111 and a rotor blade tip 119. The rotor blade tip 119 is configured as a separate element and is manufactured from an aluminum material. The rotor blade tip 119 is connected fixedly to the rotor blade main body 111 via an adhesive connection. The rotor blade main body 111 is formed by two half-shells composed of fiber composite material which are connected to one another, and is of substantially hollow form in the interior, with a rotor blade cavity 113 being delimited thereby. The rotor blade 110 has a rotor blade root region 114 which faces toward the rotor hub 112. The rotor blade root region 114 typically has a substantially circular cross section. The rotor blade root region 114 is followed by a transition region 116 and a profile region 118 of the rotor blade 110. The rotor blade 110 has with respect to a direction of longitudinal extent 120 a pressure side 122 and an opposite suction side 124.

In the rotor blade root region 114, there is provided a rotor blade connection end 126 with a flange connection 128, by means of which the rotor blade 110 is connected mechanically to a pitch bearing or an extender.

The rotor blade 110, that is, both the rotor blade main body 111 and the rotor blade tip 119, has a profile trailing edge 140 and a profile leading edge 142. A profile depth 144 is defined as a spacing from the profile trailing edge 140 to the profile leading edge 142 with respect to a profile cross section. A profile thickness 146 is defined as a spacing from the pressure side 122 to the suction side 124, wherein the maximum profile thickness of a profile cross section is intended to be meant in the present context. The profile thickness 146 is measured at right angles to the longitudinal axis 120 and to the profile depth 144. A (profile) cross section lies in a plane normal to the longitudinal axis 120.

Figure 3:
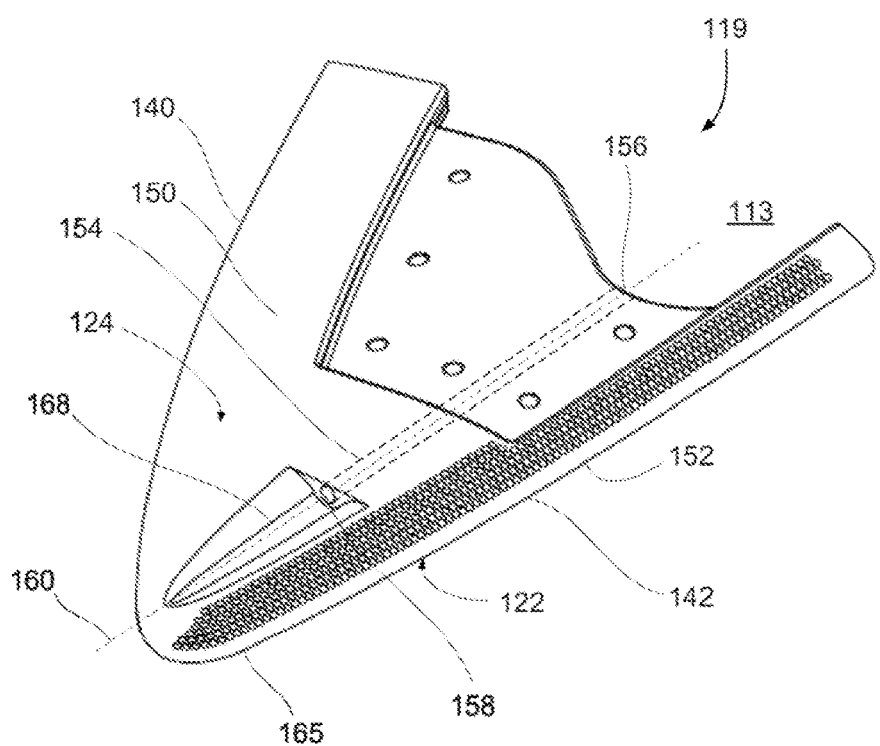
FIGS. 3 to 5 show different views of a rotor blade tip for a rotor blade according to an embodiment of the invention.
Figure 4:
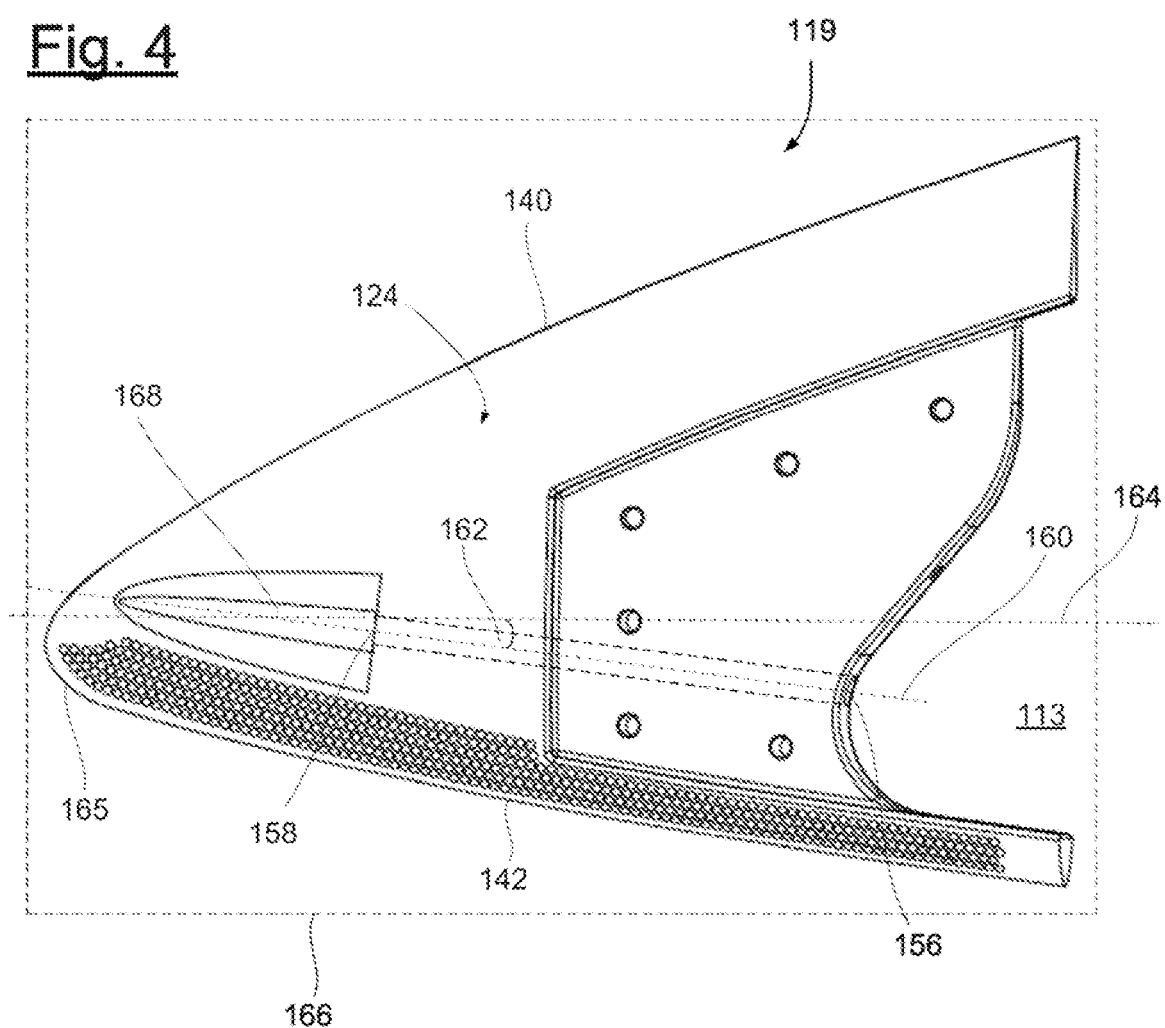
Figure 5:
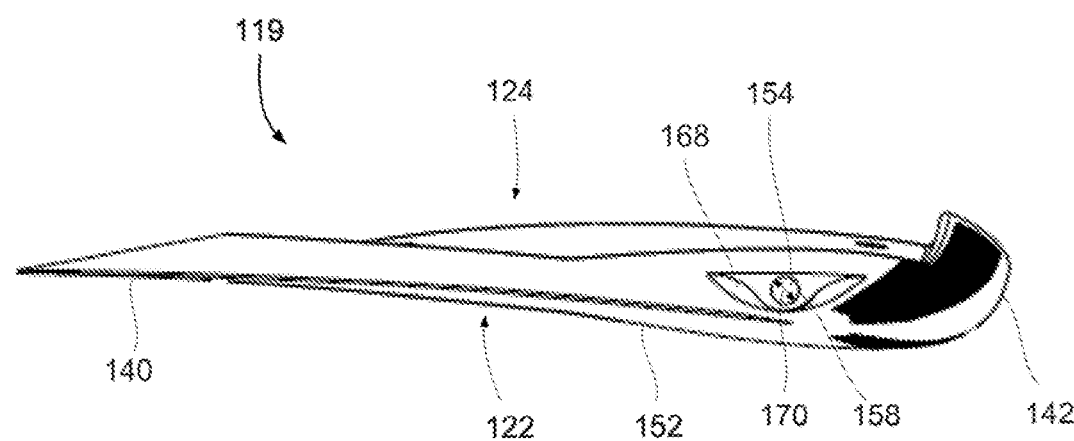

A rotor blade tip 119 according to an embodiment of the invention will be discussed in detail below and will be described on the basis of FIGS. 3 to 5. FIG. 3 shows a perspective view looking at the suction side 124 of the rotor blade tip 119, FIG. 4 shows a view looking along the rotor blade tip 119, and FIG. 5 shows a plan view of the suction side 124 of the rotor blade tip 119.

In the embodiment, the rotor blade tip 119 is connected to the rotor blade main body 111 in such a way that a substantially seamless transition from the rotor blade main body 111 to the rotor blade tip 119 with respect to the aerodynamic profile (outer contour of the rotor blade), that is, with the profile trailing and profile leading edges 140, 142 included, is provided. The rotor blade tip 119 has a suction side surface 150 (of the suction side 124) and an opposite pressure side surface 152 (of the pressure side 122).

The rotor blade tip 119 has a drainage bore 154 which extends from the rotor blade cavity 113 (indicated in FIGS. 3 and 4) to the suction side surface 150. An inlet opening 156 of the drainage bore 154 faces toward the rotor blade cavity 113, and an outlet opening 158 of the drainage bore 154 is arranged at the suction side 124. The drainage bore 154 is open only toward the suction side surface 150. In the embodiment, the drainage bore 154 has a diameter 170 of 8 mm.

The drainage bore 154 has a bore central axis 160 which extends from a pitch axis 164 at a predefined acute angle 162 lying in the range of approximately 1° to 10°. The bore central axis 160 lies in a main extent plane 166 in the direction of a tip-side end 165 of the rotor blade tip 119. The main extent plane 166 is for example a central plane of the blade tip 119 along which the blade tip has the greatest extent, for example compared with the significantly small extent in the thickness direction of the blade tip 119. What is essential is that the bore central axis 160 does not coincide with the pitch axis 164, so that, during operation, flow over the drainage bore 154 perpendicular thereto is prevented.

The drainage bore 154 runs spaced apart from the profile trailing edge 140 and profile leading edge 142 in the interior of the rotor blade tip 119.

Furthermore, the drainage bore 154 is slightly inclined in relation to the pitch axis 164 such that the bore central axis 160, from the direction of the pressure side surface 152, extends in the direction of the suction side surface 150 of the rotor blade tip 119. In other words, the drainage bore 154 runs at an angle to the main extent plane 166 of the rotor blade tip 119.

Furthermore, the suction side surface 150 has in a straight extension of the bore central axis 160 a depression 168. The depression 168 directly adjoins the drainage bore 154 and is in the form of a type of channel or trough. The depression 168 adjoins the outlet opening 158 of the drainage bore 154. The depression 168 is formed in such a way that the drainage bore 154, in a straight extension of the bore central axis 160, is freely accessible from the outside. Here, the depression 168 is shaped in such a way that, in a straight extension of the bore central axis 160, it corresponds in cross section at least to the diameter 170 of the bore. In other words, the depression 168 constitutes a type of outflow of the drainage bore 154 into which the drainage bore 154 opens.

Furthermore, the depression 168 is formed in such a "harmonious" way that, at least parallel to the bore central axis 160, no edges or steps are provided. The lines delimiting the depression 168 toward the suction side surface 150 constitute merely visible edges. Instead, the depression has a rounded, continuous contour. In other words, the depression is optimized with regard to the aerodynamic properties, with contour discontinuities and sharp edges being avoided.

The drainage bore 154 described is not open toward the pressure side 122, and so the pressure side surface 152 is not broken through by the drainage bore 154 and can form a closed surface. The drainage bore 154 is accessible only via the suction side 124. For the rotor blade tip 119, it is furthermore provided that the profile leading edge 142 and profile trailing edge 140 have a substantially closed, continuous contour. In particular, the edges 140, 142 are not broken through by the drainage bore 154.

The rotor blade tip 119 described makes possible the advantages and functions described in the introduction. In particular, highly effective and inexpensive removal of fluid, in particular (condensation) water, from the rotor blade cavity 113 is made possible.

Fluid which, as described in the introduction, can accumulate in the rotor blade cavity 113 is, via the drainage bore 154, removed to the outside only at the suction side surface 150. Maintenance of the drainage bore 154 is highly user-friendly and inexpensive since the drainage bore 154 can be drilled out in a very easily accessible and simple manner.

It is understood that the foregoing description is that of the preferred embodiments of the invention and that various changes and modifications may be made thereto without departing from the spirit and scope of the invention as defined in the appended claims.

LIST OF REFERENCE SIGNS

100 Wind turbine
102 Tower
104 Foundation
106 Nacelle
108 Rotor
110 Rotor blade
111 Rotor blade main body
112 Rotor hub 113 Rotor blade cavity
114 Rotor blade root region
116 Transition region
118 Profile region
119 Rotor blade tip
120 Direction of longitudinal extent
122 Pressure side
124 Suction side
126 Rotor blade connection end
128 Flange connection
140 Profile trailing edge
142 Profile leading edge
144 Profile depth
146 Profile thickness
150 Suction side surface
152 Pressure side surface
154 Drainage bore
156 Inlet opening
158 Outlet opening
160 Bore central axis
162 Predetermined angle
164 Pitch axis
165 Tip-side end
166 Main extent plane
168 Depression
170 Diameter

What is claimed is:

1. A rotor blade for a wind turbine, the rotor blade comprising:
    a rotor blade main body delimiting a rotor blade cavity;
    a rotor blade tip fixedly connected to said rotor blade main body;
    said rotor blade tip having a suction side surface;
    said rotor blade tip having a drainage bore formed therein fluidly communicating with said rotor blade cavity and opening to said suction side surface of said rotor blade tip so as to permit fluid in said rotor blade cavity to flow therefrom to said suction side surface of said rotor blade tip and drain to the ambient;
    said drainage bore defining a longitudinal center axis and having an outlet which opens to said suction side surface of said rotor blade tip;
    said suction side surface having a depression formed therein in the region of said outlet; and,
    said depression being configured so as to cause said suction side surface to define a continuous contour course in a direction perpendicular to said longitudinal center axis of said drainage bore.

2. The rotor blade of claim 1, wherein said rotor blade has a suction side incorporating said suction side surface; and, said drainage bore is configured so as to be accessible only from said suction side.

3. The rotor blade of claim 2, wherein said rotor blade tip has a pressure side surface lying opposite said suction side surface; and, said drainage bore is configured in said rotor blade tip so as not to open at said pressure side surface.

4. The rotor blade of claim 1, wherein said rotor blade tip has a trailing edge profile defining a closed continuous course.

5. The rotor blade of claim 1, wherein said rotor blade tip has a leading edge profile defining a closed continuous course.

6. The rotor blade of claim 1, wherein said drainage bore is configured to be freely accessible from outside along a linear extension of said longitudinal center axis.

7. The rotor blade of claim 1, wherein said depression is configured so as to permit said drainage bore to be freely accessible from outside along a linear extension of said longitudinal center axis.

8. The rotor blade of claim 1, wherein said rotor blade tip defines a tip end; said rotor blade defines a pitch axis; and, said longitudinal center axis runs at a predetermined angle to said pitch axis in a direction toward said tip end of said rotor blade tip.

9. The rotor blade of claim 8, wherein said predetermined angle lies in a range of 1° to 45°.

10. The rotor blade of claim 8, wherein said predetermined angle lies in a range of 1° to 15°.

11. The rotor blade of claim 1, wherein said drainage bore has a diameter lying in a range of 1 mm to 20 mm.

12. The rotor blade of claim 1, wherein said drainage bore has one of the following diameters: 8 mm, 9 mm or 10 mm.

13. The rotor blade of claim 1, wherein said rotor blade defines a pitch axis; said rotor blade tip has a pressure side surface lying opposite said suction side surface; said longitudinal center axis of said drainage bore is so inclined relative to said pitch axis that said longitudinal center axis runs in a direction from said pressure side surface to said suction side surface.

14. The rotor blade of claim 1, wherein the rotor blade tip is configured to have an aperture.

15. A rotor blade tip for a rotor blade of a wind turbine, a rotor blade main body delimiting a rotor blade cavity and the rotor blade tip comprising:
    said rotor blade tip being configured to be fixedly connected to said rotor blade main body;
    said rotor blade tip having a suction side surface;
    said rotor blade tip having a drainage bore formed therein fluidly communicating with said rotor blade cavity and opening to said suction side surface of said rotor blade tip so as to permit fluid in said rotor blade cavity to flow therefrom to said suction side surface of said rotor blade tip and drain to the ambient;
    said drainage bore defining a longitudinal center axis and having an outlet which opens to said suction side surface of said rotor blade tip;
    said suction side surface having a depression formed therein in the region of said outlet; and,
    said depression being configured so as to cause said suction side surface to define a continuous contour course in a direction perpendicular to said longitudinal center axis of said drainage bore.

16. A rotor blade for a wind turbine, the rotor blade comprising:
    a rotor blade main body delimiting a rotor blade cavity;
    a rotor blade tip fixedly connected to said rotor blade main body;
    said rotor blade tip having a suction side surface;
    said rotor blade tip having a drainage bore formed therein fluidly communicating with said rotor blade cavity and opening to said suction side surface of said rotor blade tip so as to permit fluid in said rotor blade cavity to flow therefrom to said suction side surface of said rotor blade tip and drain to the ambient;
    said suction side having a trough-shaped depression formed therein;
    said drainage bore defining a longitudinal center axis and having an outlet which opens directly into said trough-shaped depression on said suction side surface of said rotor blade tip;
    said trough-shaped depression being configured to extend from said outlet in the direction of said longitudinal center axis of said drainage bore and being further configured to cause said suction side surface to define a continuous contour course in a direction transverse to said longitudinal center axis of said drainage bore.

* * * * *